(12) United States Patent
Skalecki et al.

(10) Patent No.: US 7,304,947 B2
(45) Date of Patent: Dec. 4, 2007

(54) CONNECTION CREATION/TERMINATION USING PARALLEL CROSS-CONNECTION DOWNLOAD/UNDOWNLOAD PROCESSES

(75) Inventors: Darek Skalecki, Kanata (CA); Chris Wallace, Stittsville (CA); Evert Deboer, Nepean (CA); Jean Pierre Coupal, Gatineau (CA); Sandra Ballarte, Kanata (CA); Ewert Tempest, Ottawa (CA); Ahmed Areef Reza, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 828 days.

(21) Appl. No.: 10/813,059

(22) Filed: Mar. 31, 2004

(65) Prior Publication Data

US 2005/0220113 A1 Oct. 6, 2005

(51) Int. Cl.
*G01R 31/08* (2006.01)

(52) U.S. Cl. .................................... 370/230; 370/410
(58) Field of Classification Search .................. None
See application file for complete search history.

(56) References Cited

U.S. PATENT DOCUMENTS 6,628,617 B1 * 9/2003 Karol et al. ................. 370/237
2002/0003804 A1 * 1/2002 Hjalmtysson et al. ........ 370/410

* cited by examiner

*Primary Examiner*—Duc Ho
(74) *Attorney, Agent, or Firm*—Kent Daniels Ogilvy Renault LLP

(57) ABSTRACT

A method of creating/terminating a connection associated with an end-to-end path defined through a communications network. According to the invention, cross-connection download/undownload processes in each intermediate node of the end-to-end path are triggered substantially in parallel. A confirmation message indicative of successful completion of respective download/undownload processes in each intermediate node is subsequently propagated to an end-node of the path.

5 Claims, 4 Drawing Sheets

Figure 1 (PriorArt)

CONNECTION CREATION/TERMINATION USING PARALLEL CROSS-CONNECTION DOWNLOAD/UNDOWNLOAD PROCESSES

CROSS-REFERENCE TO RELATED APPLICATIONS

This is the first application filed for the present invention.

MICROFICHE APPENDIX

Not Applicable.

TECHNICAL FIELD

The present invention relates to connection creation and termination in communications networks, and in particular to connection creation/termination using parallel cross-connection download/undownload processes.

BACKGROUND OF THE INVENTION

Within the modern communications network space, various standards are used to create and terminate connections. Among these, there is Multi-Protocol Label Switching (MPLS); Generalized Multi-Protocol Label Switching (GMPLS); Label Distribution Protocol (LDP);Private Network-Network Interface (PNNI); Resource Reservation Setup Protocol (RSVP), and others. As is known in the art, all of these connection-oriented protocols (such as, for example, MPLS/GMPLS; LDP/CR-LDP); PNNI; RSVP etc.) provide a protocol for computing a path through a network, and reserving resources of each node involved in the path. Typically, for each node of the path, resource reservation involves designating involved input and output ports, as well as a portion of the bandwidth capacity of each designated port required for the connection. However, in order to set-up the end-to-end connection, and thereby enable a flow of subscriber traffic, each node must compute and set up the cross-connection through its switch fabric between the designated ports. This step of computing and establishing the cross-connection is referred to herein as "downloading" the cross-connection. The reverse process, that is the removal of the cross-connection so that resources of the node can be released for use by other connections, is referred to herein as "undownloading" the cross-connection. The process of downloading cross-connections is illustrated in FIG. 1, for the example of the proposed Constrain-based Routed-Label Distribution Protocol (CR-LDP).

FIG. 1 shows a representative path 2 mapped through a CD-LDP network between an ingress node 4 and an egress node 6, and traversing three intermediate nodes N1-N3. As shown in FIG. 1, once the path 2 has been computed and resources reserved (at 8), a Label_Map message 10 is propagated hop-by-hop from the egress node 6. In response to the Label_Map message, each intermediate node N1-N3 downloads (at 12) the required cross-connection through the node between respective input and output ports for which resources have been reserved to the connection. Thus, for example, the respective controller unit (not shown) of intermediate node N3 computes the cross-connection between ports F and G, and then establishes the computed cross-connection through its switch fabric (not shown), so that subscriber traffic of the connection will be properly routed through that node. Upon successful completion of the download, the Label_Map message 10 is then forwarded to intermediate node N2, which executes the cross-connection download between its ports D and E. Upon successful completion of the download, node N2 forwards the Label_Map message 10 to node N1, and so on, until the Label_Map message 10 arrives at the ingress node 4. The ingress node 4 responds to the Label-Map message 10 by notifying the subscriber (not shown) that the connection 2 has been established, and is ready to convey traffic, and logs the connection for billing purposes.

A directly analogous process is used when the connection is to be terminated, and the resources released. Thus, as shown in FIG. 2, a Label_Withdraw message (continuing the above CR-LDP example) is propagated hop-by-hop through the connection 2 from the egress node 6. In response to the Label_Withdraw message 14, each intermediate node N1-N3 un-downloads the cross-connection through the node, so that switch fabric and port resources dedicated to the connection 2 are released. Upon successful completion of the un-download, the Label_Withdraw message 14 is then forwarded to the next node, and so on. When the Label_Withdraw message 14 arrives at the ingress node 4, termination of the connection is complete and can be logged for billing purposes.

A limitation of the above connection creation/termination process is that connection download and undownload process require a certain amount of time to complete. For example, in large routers or switches, the process of computing and establishing a cross-connection between input and output ports can take a relatively long time. Since this operation must be performed in each node involved in the connection 2, the cumulative time required to create the connection can become significant. This is particularly disadvantageous in the case of failure restoration, where it becomes necessary to create a protection connection around a failed link. Clearly, any delay in restoring traffic flow between the ingress and egress nodes 4 and 6 is undesirable, and should be minimised.

Accordingly, techniques for efficiently downloading/undownloading cross-connections in a network remain highly desirable.

SUMMARY OF THE INVENTION

An object of the present invention is to provide a method of efficiently downloading/undownloading cross-connections in a network.

Accordingly, an aspect of the present invention provides a method of creating/terminating a connection associated with an end-to-end path defined through a communications network. According to the invention, cross-connection download/undownload processes in each intermediate node of the end-to-end path are triggered substantially in parallel. A confirmation message indicative of successful completion of respective download/undownload processes in each intermediate node is subsequently propagated to an end-node of the path.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
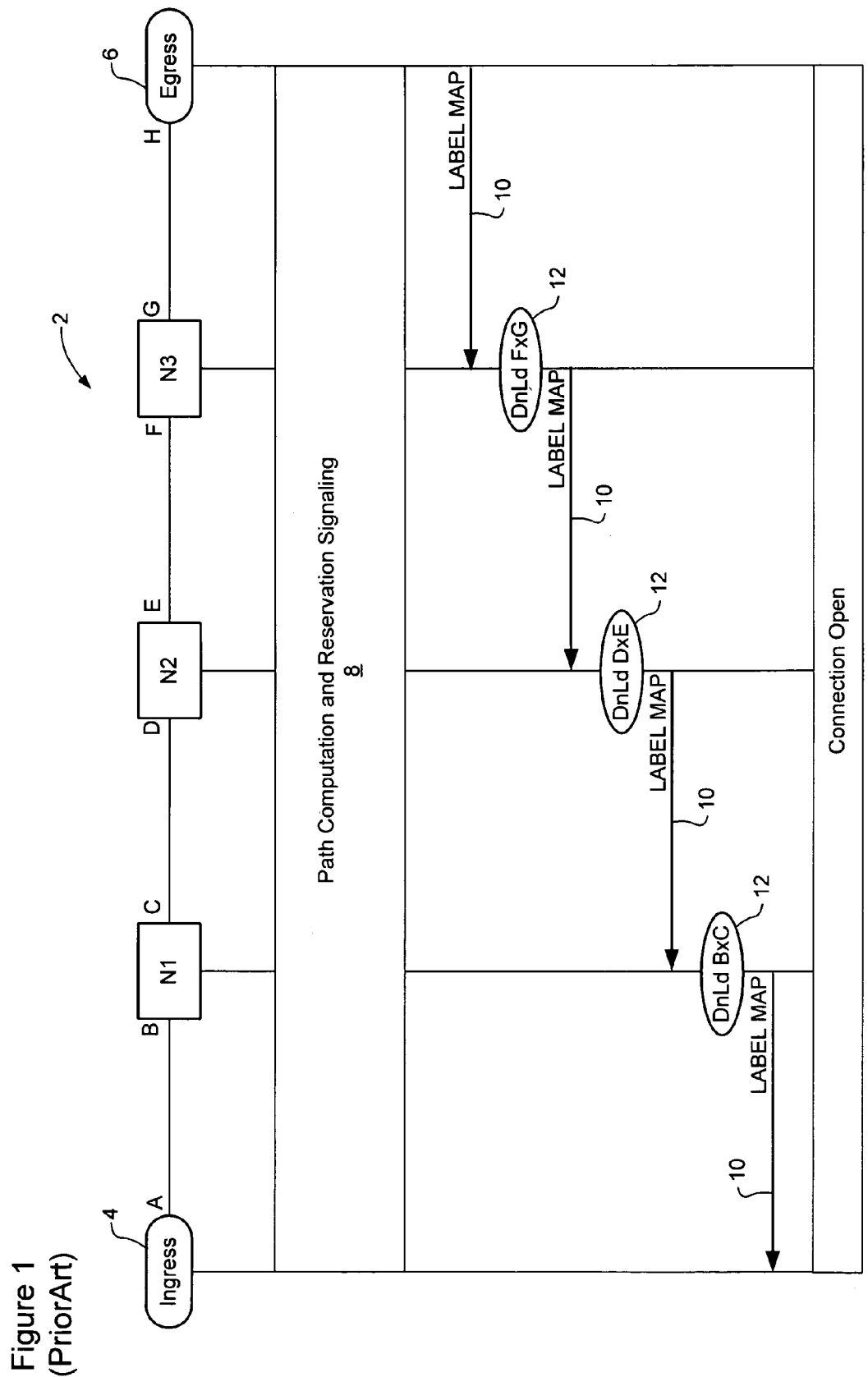
FIG. 1 is a message-flow diagram illustrating a conventional process of downloading cross-connections through a network.
Figure 2:
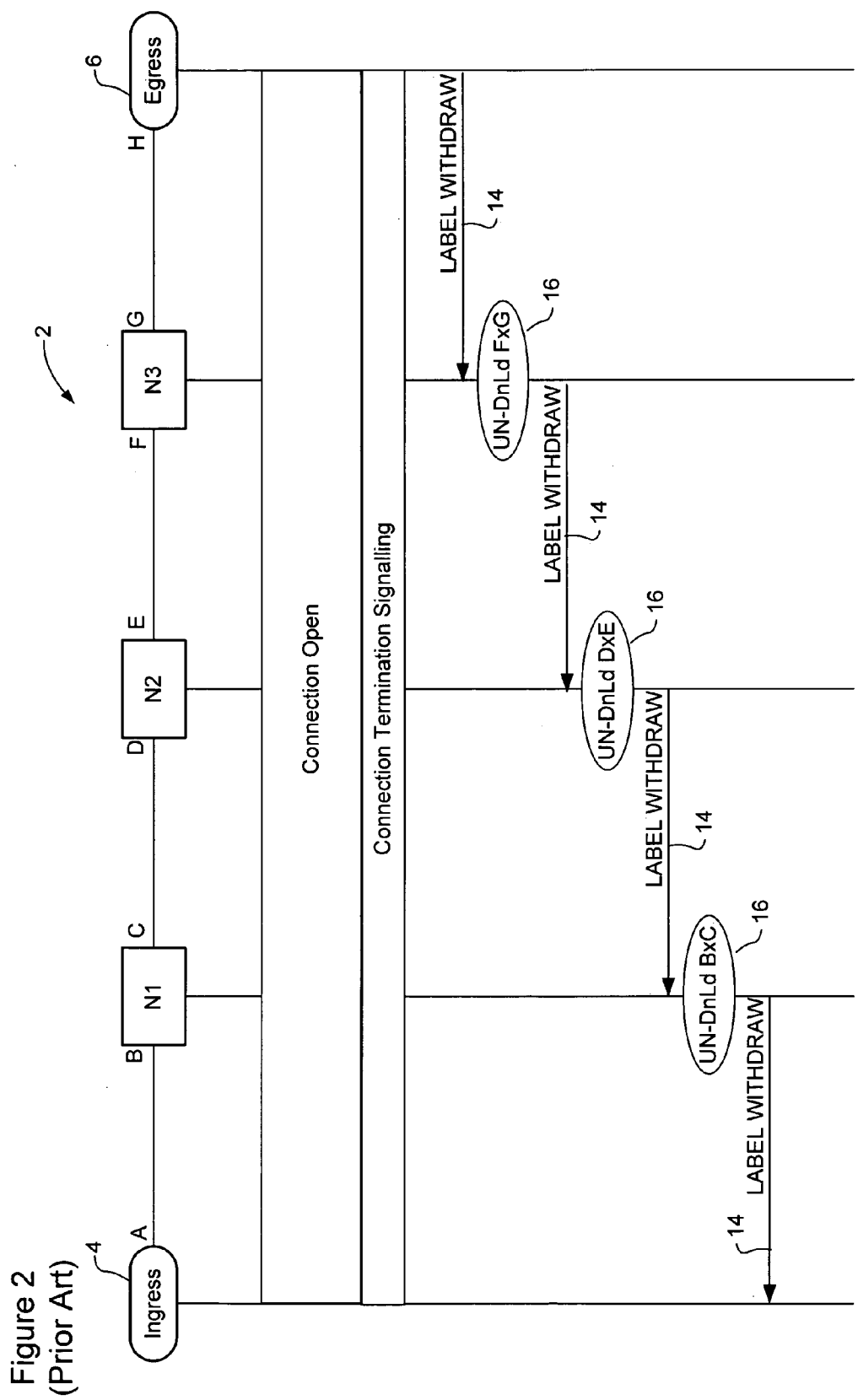
FIG. 2 is a message-flow diagram illustrating a conventional process of undownloading cross-connections through a network.
Figure 3:
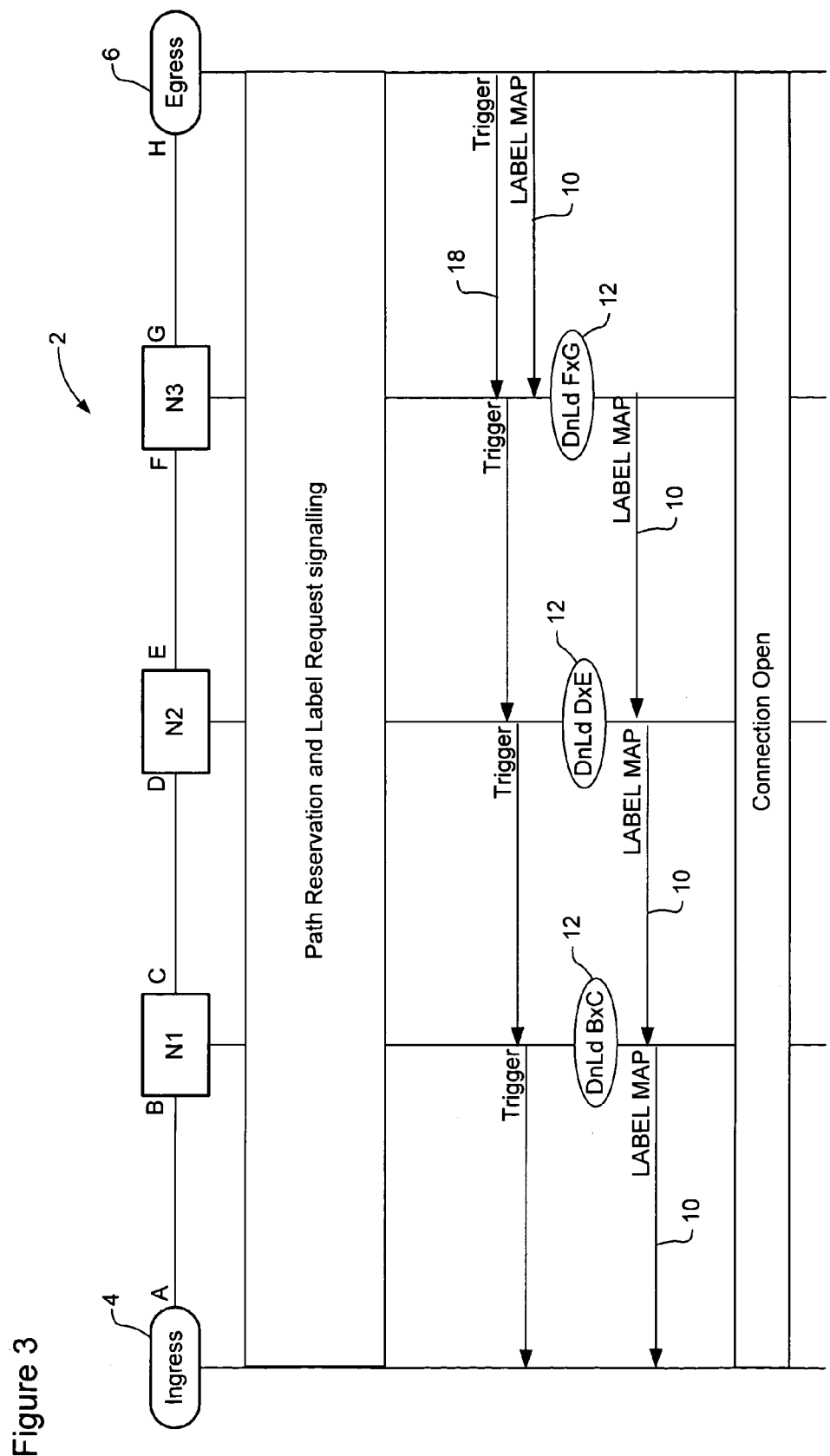
FIG. 3 is a message-flow diagram illustrating a process of downloading cross-connections in accordance with an embodiment of the present invention.

The present invention provides a method of creating/terminating a connection associated with an end-to-end path defined through a communications network. A representative embodiment of the invention is described below with reference to FIGS. 3 and 4.

In general, the present invention operates by triggering the download/undownload process in each intermediate node of the path substantially in parallel. A confirmation message is then propagated through the path as the process is successfully completed in each node. In the case of a CR-LDP network illustrated in FIG. 3, this can be accomplished by adding a "Download_Trigger" message type to the CR-LDP standard. Accordingly, upon completion of the conventional path computation and resource reservation signalling (at 8), the egress node 6 launches the Download_Trigger message 18 through the path 2 toward the ingress node 4. The Download_Trigger message 18 thus propagates hop-by-hop through the path 2. At each intermediate node N1-N3, the Download_Trigger message 18 is forwarded to the next adjacent node with minimum delay. At the same time, however, the cross-connection download 12 is initiated. Consequently, respective downloads will be executed in all the intermediate nodes in parallel.

Following launch of the Download_Trigger message 18, the egress node 6 also launches the conventional CR-LDP Label_Map message 10, which is then propagated hop-by-hop toward the ingress node 4. In this case, the CR-LDP protocol is modified such that, the Label_Map message 10 does not cause initiation of the cross-connection download 12. Instead, the Label_Map message 10 is simply held in each intermediate node N1-N3 until the node's respective download 12 has successfully completed. Once this occurs, the Label_Map message 10 is forwarded to the next adjacent node in the path 2. As may be seen, the Label_Map message 10 therefore serves as a "confirmation message" indicating successful download of cross-connections in each node of the end-to-end path 2.

Because the Label_Map message 10 is held in each intermediate node until successful completion of that node's cross-connection download 12, the actual timing of the launch of the Label_Map message 10 by the egress node 6 is not critical. For example, the Label_Map message 10 may be launched immediately following the Download_Trigger message 18. At the first intermediate node (i.e. node N3 in FIG. 3) the Download_Trigger message 18 is immediately forwarded (to N2 in FIG. 3) and the Label_Map message 10 held until completion of node N3's download process 12. Since downloads typically take about the same amount of time in each node, the Label_Map message will arrive at node N2 at about the same time that node's download process is completing. In such a case, the Label_Map message 10 would then be forwarded (to N1 in FIG. 3) with minimal further delay. The same situation will normally exist in each intermediate node of the path, so that most of the propagation delay experienced by the Label_Map message 10 will occur in the first intermediate node (node N3) of the path 2, as may be seen in FIG. 3.

As may be appreciated, parallel execution of download processes in each involved node of the path 2 dramatically reduces the total time required to set up the end-to-end connection, as compared to conventional methods in which cross-connections are downloaded consecutively as the Label_Map message 10 propagates through the path.

Figure 4:
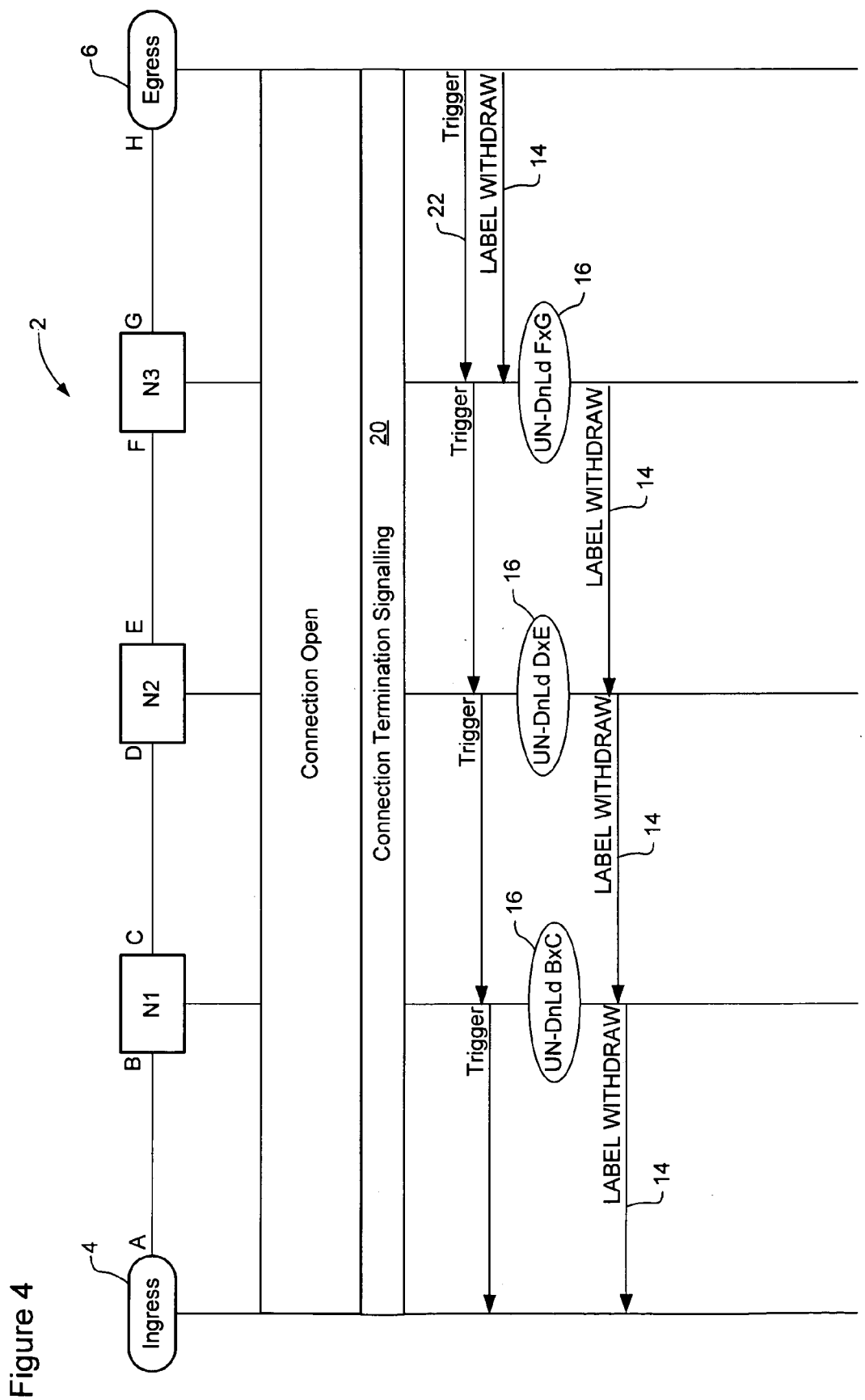
FIG. 4 is a message-flow diagram illustrating a process of undownloading cross-connections in accordance with an embodiment of the present invention.

Referring now to FIG. 4, a directly analogous process can be implemented to undownload cross-connections, and thereby release node resources for use in other connections. In the case of a CR-LDP network, an "UnDownload_Trigger" message type can be added to the CR-LDP standard. Accordingly, to complete the connection termination signalling (at 20), the egress node 6 launches the UnDownload_Trigger message 22, which propagates hop-by-hop through the connection. At each intermediate node N1-N3, the UnDownload_Trigger message 22 is forwarded to the next adjacent node with minimum delay. At the same time, however, the cross-connection undownload 16 is initiated. Consequently, respective undownload procedure 16 will be executed in all the intermediate nodes in parallel.

Following launch of the UnDownload_Trigger message 22, the egress node 6 also launches the conventional CR-LDP Label_Withdraw message 14, which is then propagated hop-by-hop toward the ingress node 4. In this case, the CR-LDP protocol is modified, such that the Label_Withdraw message 14 does not cause initiation of the undownload process 16. Instead, the Label_Withdraw message 14 is simply held in each intermediate node until that node's respective undownload process 16 has successfully completed. Once this occurs, the Label_Withdraw message 14 is forwarded to the next adjacent node in the path. As may be seen, the Label_Withdraw message therefore serves as a "confirmation message" indicating successful undownload of cross-connections in each node of the end-to-end path 2.

Because the Label_Withdraw message 14 is held in each intermediate node N1-N3 until successful completion of that node's undownload process 16, the actual timing of the launch of the Label_Withdraw message 14 by the egress node 6 is not critical. For example, the Label_Withdraw message 14 may be launched immediately following the UnDownload_Trigger message 22. At the first intermediate node (node N3 in FIG. 4) the UnDownload_Trigger message 22 is immediately forwarded (to N2 in FIG. 4) and the Label_Withdraw message 14 held until completion of node N3's undownload process 16. Since the undownload process typically takes about the same amount of time in each node, the Label_Withdraw message 14 will arrive at node N2 at about the same time that node's undownload 16 is completing. In such a case, the Label_Withdraw message 14 would then be forwarded (to N1 in FIG. 4) with minimal further delay. The same situation will normally exist in each intermediate node of the path 2, so that most of the propagation delay experienced by the Label_Withdraw message 14 will occur in the first intermediate node (node N3) of the path, as may be seen in FIG. 4.

In the foregoing description, the present invention is described by way of a representative embodiment deployed in a CR-LDP network. However, those of ordinary skill in the art will recognise that the present invention can equally be deployed in any network designed for connection-oriented traffic flows. As such, it will be appreciated that the present invention is in no way limited to the specific example described above with reference to FIGS. 3 and 4.

The embodiment(s) of the invention described above is(are) intended to be exemplary only. The scope of the invention is therefore intended to be limited solely by the scope of the appended claims.

We claim:

1. A method of creating/terminating a connection associated with an end-to-end path defined through a communications network the end-to-end path traversing at least two intermediate node, the method comprising steps of:
   triggering parallel cross-connection download/undownload processes in each intermediate node of the end-to-end path; and
   propagating a confirmation message indicative of successful completion of respective download/undownload processes in each intermediate node to an end-node of the path.

2. A method as claimed in claim 1, wherein the step of triggering parallel cross-connection download/undownload processes comprises steps of:
   propagating a trigger message hop-by-hop through the end-to-end path; and
   at each intermediate node of the end-to-end path, upon receipt of the trigger message:
      forwarding the trigger message to a next node of the path with minimum delay; and
      initiating the download/undownload process.

3. A method as claimed in claim 1, wherein the step of propagating a confirmation message comprises, at each intermediate node of the end-to-end path, steps of:
   receiving the confirmation message;
   detecting successful completion of the respective download/undownload process; and
   forwarding the confirmation message to a next node of the path.

4. A method of downloading/undownloading a cross-connection through an intermediate node within an end-to-end path of a communications network, the path traversing at least two intermediate nodes, the method comprising steps of:
   receiving a trigger message and a confirmation message;
   upon receipt of the trigger message:
      forwarding the trigger message to a next node of the path with minimum delay; and
      initiating downloading/undownloading of the cross-connection; and
      subsequently forwarding the confirmation message to the next node upon successful completion of downloading/undownloading the cross-connection;
   whereby forwarding the trigger message and initiating a download/undownload process upon receipt of the trigger message, causes parallel cross-connection download/undownload processes in each intermediate node of the end-to-end path.

5. A node of a communications network, the node being operative in accordance with a program for downloading/undownloading a cross-connection through the node connected as an intermediate node within an end-to-end path of the communications network, the path traversing at least two intermediate nodes, the program executing in the node and controlling the node to:
   receive a trigger message and a confirmation message;
   upon receipt of the trigger message:
      forward the trigger message to a next node of the path with minimum delay; and
      initiate downloading/undownloading of the cross-connection between predetermined input and output ports of the node; and
      subsequently forward the confirmation message to the next adjacent node upon successful completion of downloading/undownloading the cross-connection;
   whereby forwarding the trigger message and initiating downloading/undownloading upon receipt of the trigger message, causes parallel cross-connection download/undownload processes in each intermediate node of the end-to-end path.

* * * * *